United States Patent
Oberndörfer

(10) Patent No.: US 9,671,000 B2
(45) Date of Patent: Jun. 6, 2017

(54) DEVICE FOR CONTROLLING A FURNITURE DRIVE

(71) Applicant: DewertOkin GmbH, Kirchlengern (DE)

(72) Inventor: Andreas Oberndörfer, Bielefeld (DE)

(73) Assignee: DewertOkin GmbH, Kirchlengern (DE)

( * ) Notice: Subject to any disclaimer, the term of this patent is extended or adjusted under 35 U.S.C. 154(b) by 355 days.

(21) Appl. No.: 14/412,354

(22) PCT Filed: Jun. 27, 2013

(86) PCT No.: PCT/EP2013/063469
§ 371 (c)(1),
(2) Date: Dec. 31, 2014

(87) PCT Pub. No.: WO2014/005913
PCT Pub. Date: Jan. 9, 2014

(65) Prior Publication Data
US 2015/0135865 A1  May 21, 2015

(30) Foreign Application Priority Data
Jul. 3, 2012  (DE) .................. 10 2012 211 508

(51) Int. Cl.
*F16H 25/20* (2006.01)
*A47C 20/04* (2006.01)

(52) U.S. Cl.
CPC ....... *F16H 25/2025* (2013.01); *A47C 20/041* (2013.01); *F16H 2025/209* (2013.01); *Y10T 74/18792* (2015.01)

(58) Field of Classification Search
CPC .................. F16H 25/2025; F16H 2025/209
See application file for complete search history.

(56) References Cited

U.S. PATENT DOCUMENTS

RE25,255 E * 10/1962 Brandt ................ F16H 25/2025
74/89.38
3,188,897 A * 6/1965 De Valliere .............. B23G 3/04
411/433

(Continued)

FOREIGN PATENT DOCUMENTS

DE       29811566 U1    8/1998
JP       S 63-58872 A   3/1988

(Continued)

OTHER PUBLICATIONS

Office Action issued May 25, 2016 in JP Application No. 2015-519088.

(Continued)

*Primary Examiner* — Terence Boes
(74) *Attorney, Agent, or Firm* — Panitch Schwarze Belissario & Nadel LLP

(57) ABSTRACT

A device for controlling an electromotive linear drive configured as a furniture drive for adjusting movably mounted parts of reclining and seating furniture, consisting of at least one threaded spindle (4, 5) that can be driven via a worm gear for displacing a lifting element, and comprising a guide body (7) which is arranged in a rotationally fixed manner on the respective threaded spindle (4, 5) and on which a worm wheel (6) is rotatably mounted, a coupling sleeve (8) which is mounted in a rotationally fixed manner, but is axially displaceable on the respective guide body (7), from which the worm wheel (6) and the guide body (7) can optionally be connected or separated via a claw clutch, and in each case an actuation element which is provided for displacing the coupling sleeves (8) as well as a switching mechanism for driving the respective actuation element.

15 Claims, 4 Drawing Sheets

(56) References Cited

U.S. PATENT DOCUMENTS

| | | | | |
|---|---|---|---|---|
| 4,189,950 A | * | 2/1980 | Killian | F16H 25/2025 74/89.38 |
| 5,970,812 A | * | 10/1999 | Fan | B23Q 5/408 269/181 |
| 6,240,800 B1 | | 6/2001 | Bokamper et al. | |
| 2016/0017966 A1 | * | 1/2016 | Wu | F16H 25/2025 74/89.38 |

FOREIGN PATENT DOCUMENTS

| | | |
|---|---|---|
| JP | 2000046125 A | 2/2000 |
| JP | 2005512714 A | 5/2005 |
| WO | 0229284 A1 | 4/2002 |
| WO | 03055359 A1 | 7/2003 |
| WO | 2007093181 A1 | 8/2007 |
| WO | 2011066836 A1 | 6/2011 |

OTHER PUBLICATIONS

Int'l Preliminary Report on Patentability issued Jan. 15, 2015 in Int'l Application No. PCT/EP2013/063469.
Int'l Search Report issued Aug. 26, 2013 in Int'l Application No. PCT/EP2013/063469.

* cited by examiner

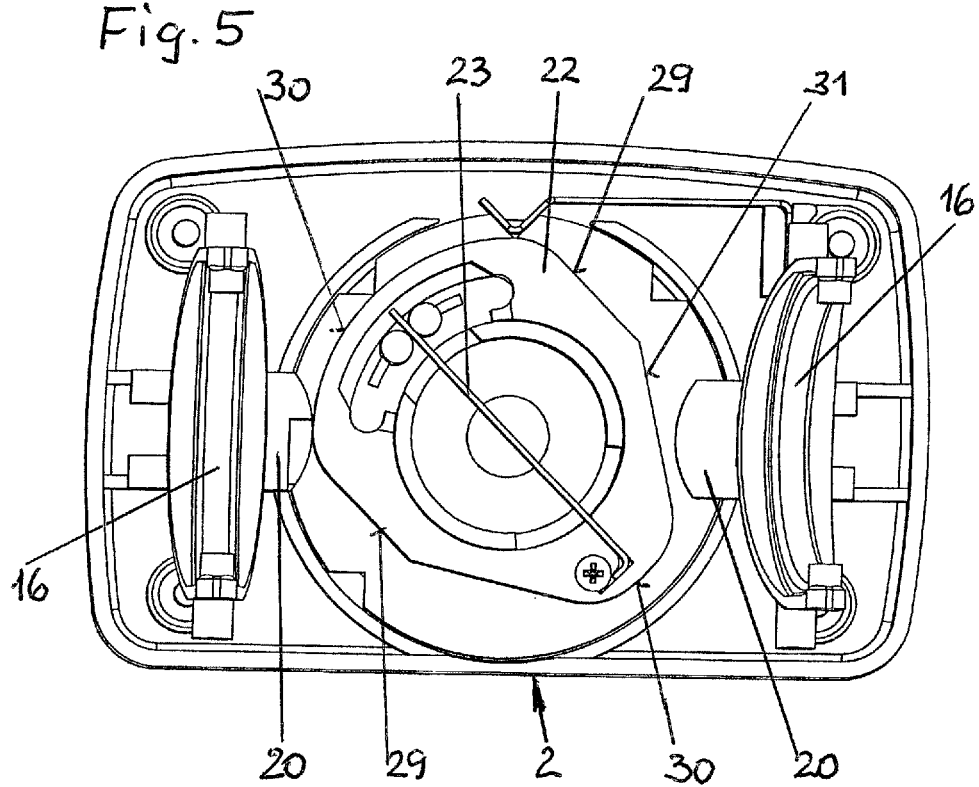

DEVICE FOR CONTROLLING A FURNITURE DRIVE

CROSS-REFERENCE TO RELATED APPLICATIONS

This application is a Section 371 of International Application No. PCT/EP2013/063469, filed Jun. 27, 2013, which was published in the German language on Jan. 9, 2014, under International Publication No. WO 2014/005913 A1 and the disclosure of which is incorporated herein by reference.

BACKGROUND OF THE INVENTION

The invention concerns a device for controlling an electric motor-actuated linear drive in the form of a furniture drive for adjusting moveably mounted parts of lying and seating furniture, comprising at least one threaded spindle drivable by way of a worm gear transmission for displacement of a respective stroke element, a guide body which is non-rotatably arranged on the respective threaded spindle and on which a worm gear is rotatably mounted, a coupling sleeve which is mounted non-rotatably but axially displaceably on the respective guide body and with which the worm gear and the guide body can be selectively connected or separated by means of a claw coupling, a respective actuating element serving for displacement of the coupling sleeves and a shift mechanism for driving the respective actuating element.

In a known electric motor-actuated furniture drive of the specified kind (EP 0 968 675 B1) the coupling sleeves are displaced by means of actuating pins to couple the threaded spindles to the worm gears and to uncouple them therefrom. The movement of the actuating pins is produced either by means of hand levers or by Bowden cables. The coupling halves which are moveable relative to each other in the axial direction of the threaded spindles are in that case moved at a relatively slow speed, that is to say the face tooth arrangements or claws of the claw coupling are separated from each other only slowly upon disconnection of the coupling and are moved gradually towards each other again when coupling is implemented. In the operating conditions in which the coupling is "almost uncoupled" and "almost coupled" those slow movements of the coupling halves lead to heavy loadings on the tooth arrangements because coupling shift is effected under load or while torque is being transmitted. In the case of that shift mechanism, that can result in severe wear of the coupling elements. In normal use that admittedly plays only a minor part, especially as the wearing parts can be so designed that they have the same service life as the corresponding articles of furniture. If however the furniture parts have to be very frequently adjusted, like for example in the hospital or care sector, then the wear of the coupling parts can under some circumstances have a detrimental effect.

BRIEF SUMMARY OF THE INVENTION

Therefore the object of the invention is to provide a coupling option in which the coupling halves are very substantially treated gently upon coupling and uncoupling.

According to the invention that object is attained in that provided as the shift mechanism is a knob connected by way of a spring element to a rotatably mounted eccentric disc, the eccentric disc has latching grooves which are arranged at spacings and which are associated with predetermined shift positions of the knob, a prestressed cam spring bears against the eccentric disc and is latchable with a cam projection provided on the spring into the latching grooves, and the eccentric disc is operatively connected to the actuating elements of the coupling sleeves.

The structure according to the invention provides a completely novel coupling mechanism in which uncoupling and coupling are implemented suddenly. In that case, due to the influence of the prestressed spring elements, the arrangement passes rapidly through the intermediate positions of the knob so that coupling and uncoupling is effected in a very short time and as a result the coupling halves are prevented from rubbing over each other for a prolonged period of time.

The new structure can be used both in the case of dual drives and single drives and also in the case of modified drives.

The worm transmissions and the threaded spindles driven thereby, insofar as the arrangement involves a dual drive, can be arranged in different positions, for example in succession, in mutually juxtaposed relationship and with an angular displacement relative to each other. In a preferred embodiment, in the case of a dual drive, there are two successively arranged and mutually aligned threaded spindles.

The knob provided for actuation of the shift mechanism is preferably in the form of a rotary knob. Alternatively however the knob can also be adapted to be slidable.

The eccentric disc is desirably mounted rotatably in a switch housing.

The knob which is preferably in the form of a rotary knob and which serves to trigger the shift mechanism can in that case also be mounted rotatably in a round opening in the eccentric disc.

To be able to adjust the coupling operations by means of the rotary knob in the optimum fashion the eccentric disc is desirably symmetrical and has a larger diameter and a smaller diameter, wherein the dimensions of the larger diameter at both sides of the point of rotation of the eccentric disc and also the dimensions of the smaller diameter at both sides of the point of rotation of the eccentric disc are of equal length.

Preferably the region of the larger diameter of the eccentric disc is narrower on one side than on the diametrally opposite side. In that way it is possible to achieve all required adjustment options with few angular positions in respect of the rotary knob.

The spring element which is intended to implement the sudden uncoupling and coupling actions is preferably in the form of a leaf spring which is fixed with one end in the opening in the eccentric disc and which sits with its other end between two abutment pins on the rotary knob.

In their normal position the coupling sleeves are held in their coupled position under a spring bias. In that case the coupling sleeves can be biased by means of a plurality of coil springs which are arranged distributed over the end face thereof and which are supported against the worm gear.

Preferably the actuating elements for displacement of the coupling sleeves are in the form of shift claws which engage with guide pins arranged at both sides on mutually opposite sides of the respective coupling sleeve into a guide groove on the periphery of the coupling sleeve.

Desirably the shift claws are arranged pivotably, by being mounted on pivot axis members arranged perpendicularly to the threaded spindles.

At their rear sides the shift claws have projecting entrainment pins which are actuable directly or indirectly by the rotation of the eccentric disc.

Sliders can provided for transmission of the force from the eccentric disc to the entrainment pins of the shift claws, which sliders are guided in the axial direction of the threaded spindles, wherein the sliders upon rotation of the eccentric disc in contact with the large diameter thereof urge the coupling sleeves which are biased by the coil springs into the uncoupled position against the spring bias of the springs.

In the uncoupled condition of the coupling sleeves, in which the rotational connection between motor and spindle is separated, emergency lowering can be implemented so that fast reliable lowering of the moveable furniture parts can be effected even in the event of a power failure or in an emergency situation, which is occasionally required in particular in the hospital and care sector.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention is shown by way of example in the drawing and is described in detail hereinafter with reference to the drawing in which:

FIG. 5 shows the latched consequential condition.

DETAILED DESCRIPTION OF THE INVENTION

Figure 1:
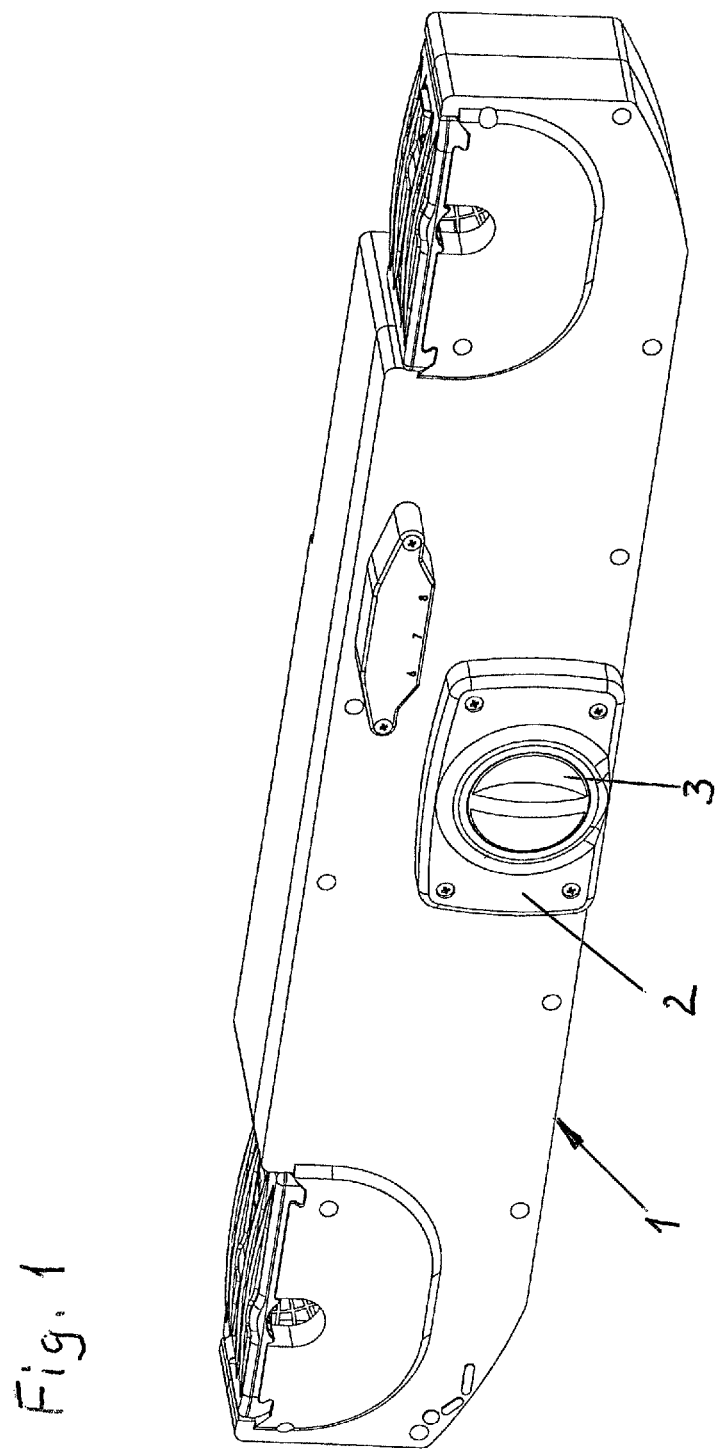
FIG. 1 shows a perspective view of an electric motor-actuated linear drive in the form of a dual drive.

FIG. 1 of the drawing shows an overall view of the dual drive 1. A switch housing 2 is screwed to the side wall at the centre of the dual drive 1. Arranged in the switch housing 2 is a rotary knob 3 which is accessible from the exterior and which is to be actuated by hand.

Figure 2:
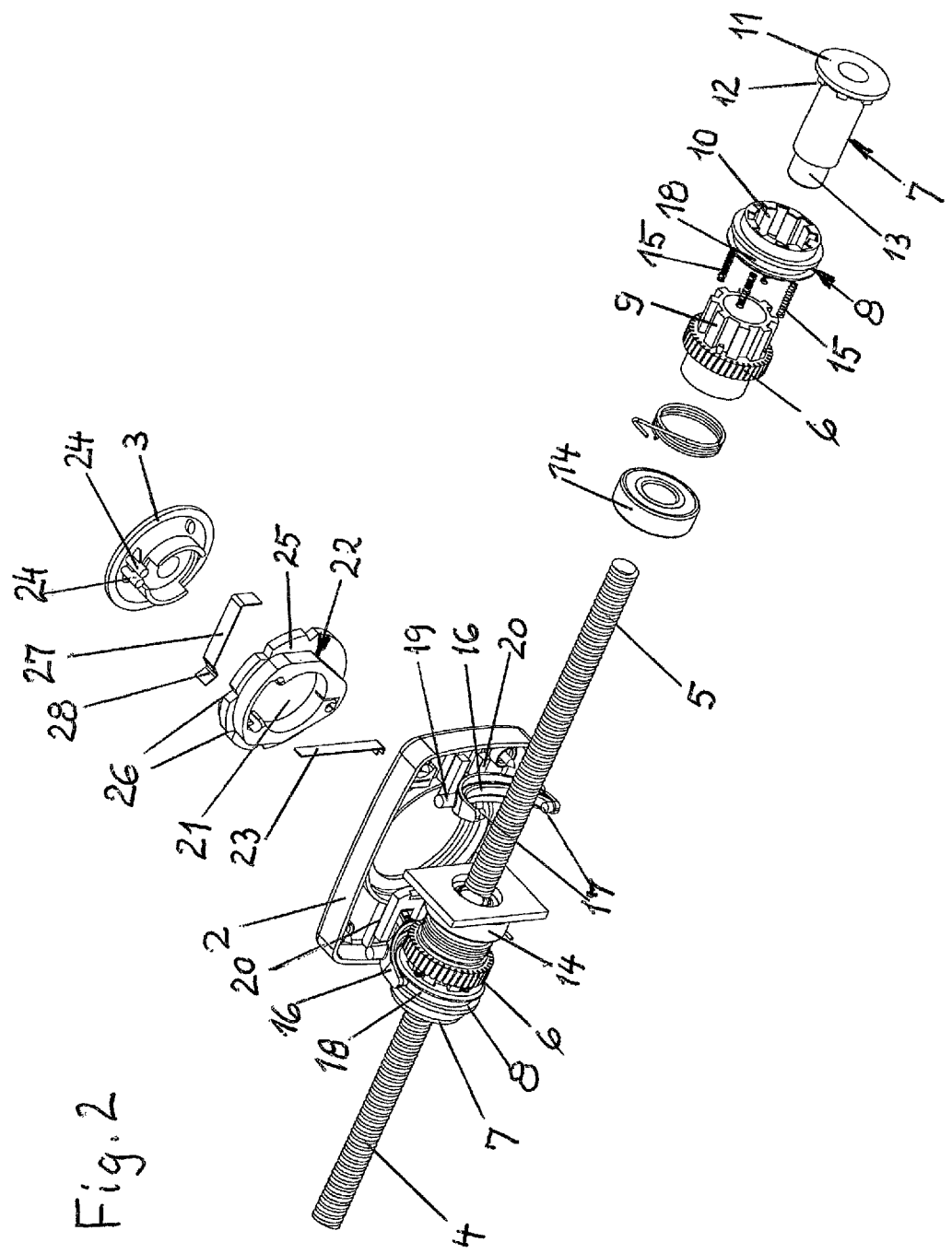
FIG. 2 shows the substantial parts of the drive mechanism, partly as an exploded view, more specifically as viewed from the rear side of the view shown in FIG. 1.

FIG. 2 shows the essential parts of the interior of the dual drive 1, more specifically viewed from the rear of the view shown in FIG. 1.

An essential component of the drive mechanism is two threaded spindles 4 and 5 mounted in the housing of the dual drive 1. The two threaded spindles 4 and 5 which are arranged in mutually aligned relationship are respectively driven by way of a worm gear transmission, of which only the respective worm gear 6 is shown in FIG. 2. If the threaded spindles 4 and 5 are driven either simultaneously or selectively, as a result per se known stroke elements (not shown) are displaced, with which moveable furniture parts can be raised and lowered.

A guide body 7 is non-rotatably and non-slidably arranged on each of the threaded spindles 4 and 5. The worm gear 6 mounted rotatably on the guide body 7 can be coupled to and uncoupled from the guide body 7 by means of an axially displaceable coupling sleeve 8. To achieve that, the coupling sleeve 8 is connected axially displaceably but non-rotatably to the worm gear 6, more specifically in that arrangement the coupling sleeve 8 is fitted on an extension 9, designed in the form of a splined shaft, of the worm gear 6, wherein the internal profile 10 of the coupling sleeve 8 is adapted to the splined shaft profile of the worm gear extension 9.

The guide body 7 which is carried non-rotatably and axially non-slidably on the respective threaded spindle 4 and 5 is provided at its end remote from the worm gear 6 with a flange 11 which, at its inside towards the coupling sleeve 8, is provided with a counterpart profile 12 to the internal profile 10 of the coupling sleeve 8. Therefore, by axial displacement of the coupling sleeve 8, the worm gear 6 can be selectively coupled to or uncoupled from the respective threaded spindle 4 and 5. In that case the internal profile 10 of the coupling sleeve 8 and the counterpart profile 12 on the flange 11 of the guide body 7 act in the manner of a claw coupling.

The individual parts are shown as an exploded view on the right-hand side in FIG. 2 while the individual parts are shown in the assembled condition on the left-hand side thereof. In that respect it can be seen that the stepped ends 13 of the guide body 7, that face towards the centre of the dual drive 1, are respectively carried in a ball bearing 14.

The coupling sleeves 8 which are mounted non-rotatably but axially displaceably relative to the respective worm gear 6 are held in a biased condition in their coupled position in which the internal profile 10 of the respective coupling sleeve 8 is latched into the corresponding counterpart profile 12 on the guide body 7. The spring bias for the coupling sleeves 8 is produced by a plurality of coil springs 15 which are arranged distributed over the end face, that is towards the respective worm gear 6, of the coupling sleeve, with the coil springs 15 being supported against the worm gear 6.

An actuating element in the form of a shift claw 16 serves to displace each coupling sleeve 8. The shift claws 16 are provided with guide pins arranged on both sides, on opposite sides of the coupling sleeve 8, and engage into a guide groove 18 on the periphery of the coupling sleeve 8.

The shift claws 16 are mounted on pivot axis members 19 arranged perpendicularly to the threaded spindles 4 and 5. At their rear sides the shift claws 16 have projecting entrainment pins which however cannot be seen in the drawing. The entrainment pins are moved by means of sliders 20, whereby pivotal movement of the shift claws 16 is produced.

Actuation of the shift claws 16 is effected by way of the rotary knob 3 shown in FIG. 1 and provided in the switch housing 2.

FIG. 2 shows a perspective view illustrating the rear side of the rotary knob 3.

As can be seen from the corresponding exploded view the rotary knob 3 is mounted in a round opening in an eccentric disc 22. The eccentric disc 22 is in turn mounted rotatably in the switch housing 2.

Arranged in the round opening 21 in the eccentric disc 22 is a leaf spring 23 which can be fixedly connected to the eccentric disc 22 and which is operatively connected to the rotary knob 3.

The leaf spring 23 which is fixed with its one end in the round opening 21 in the eccentric disc 22 is fitted with its other end between two abutment pins 24 provided on the rotary knob 3. In that arrangement the leaf spring 23 engages with play between the two abutment pins 24 so that it is moveable in the intermediate space formed by the abutment pins 24.

The eccentric disc 22 is provided with a substantially circular flange 25, on which are provided latching grooves 26 arranged at spacings.

A prestressed cam spring 24 bears against the eccentric disc 22 and is latchable into the latching grooves 26 with a cam projection 28 provided on the spring 27. In that case each latching position corresponds to a given shift position of the rotary knob. Provided to the left and the right of the latching groove which determines the central position or the normal operating condition are respectively two further latching grooves 26 at equal spacings.

Figure 3:
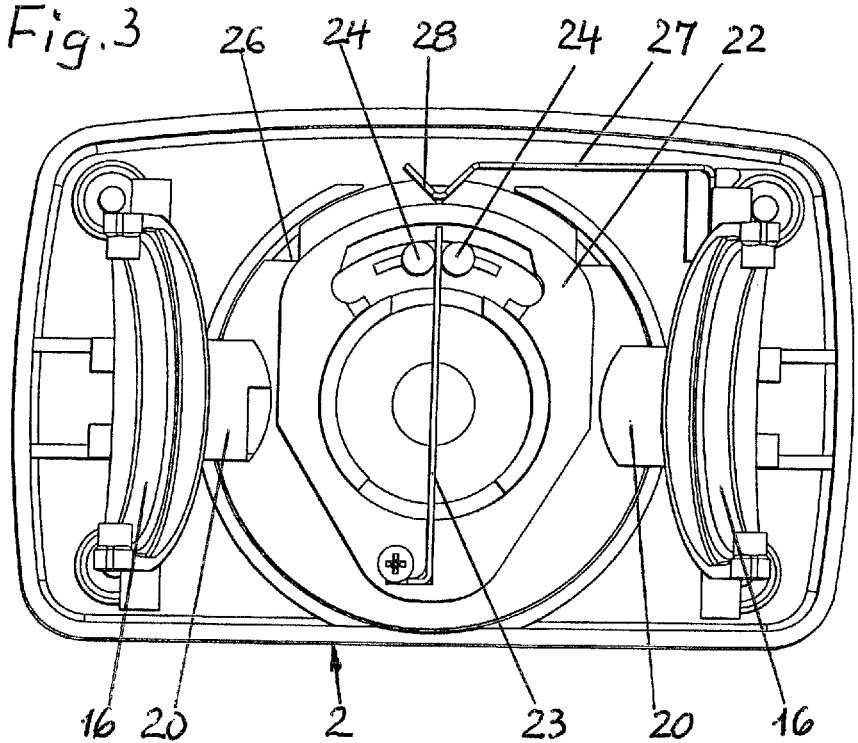
FIG. 3 is a view on an enlarged scale of the shift mechanism viewed from the interior of the housing, more specifically in the normal operating condition.
Figure 4:
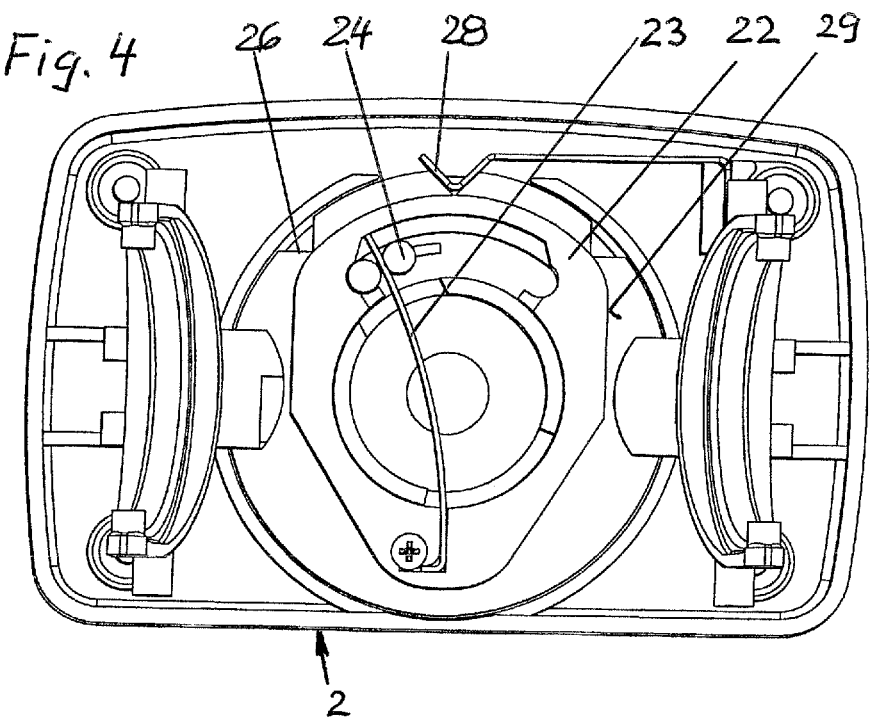
FIG. 4 shows the same view as FIG. 3 in the biased condition of the shift mechanism.

FIGS. 3 to 5 show various positions of the rotary knob 3 illustrating the sudden shifting process.

FIG. 3 shows the normal operating condition, that is to say the neutral central position of the rotary knob 3. In that normal operating condition the shift claws 16 are each pivoted outwardly, that is to say both claws couplings are in the coupled condition. In that case the sliders 20 are inactive and are still not touched by the eccentric disc 22. In that respect therefore it is exclusively the coil springs 15 which are shown in FIG. 2 and which hold the respective coupling sleeve 8 in the coupled condition, that are operative.

If now as shown in FIG. 4 the rotary knob 3 is turned slightly in the anti-clockwise direction in the drawing then the free end of the leaf spring 23, which fits between the abutment pins 24 of the rotary knob 3, is bent towards the left so that a biasing stress gradually builds up. The eccentric disc 22 is however still held fast in that position by the cam spring 27 as the cam projection 28 thereof sits fixedly in the upper latching groove 26.

When the rotary knob 3 is then further turned into the 45° position shown in FIG. 5 then, by virtue of the force of the stressed leaf spring 23, the eccentric disc 22 is abruptly rotated through 45° towards the left, in which case at the same time the cam projection on the cam spring 27 latches into the following latching groove 26 which is displaced through 45° relative to the central latching groove 26. In that operating condition the leaf spring 23 is relieved of stress, as can be seen from FIG. 5, that is to say it assumes a straight position.

The eccentric disc 22 is symmetrical and has a larger diameter 30 and a smaller diameter 29, wherein the dimensions of the larger diameter 30 at both sides of the point of rotation of the eccentric disc 22 and also the dimensions of the smaller diameter at both sides of the point of rotation of the eccentric disc 22 are of equal length.

While in FIGS. 3 and 4, that is to say in the normal operating condition, the two sliders 20 are in opposite relationship to the region of the smaller diameter 29 of the eccentric disc 22 and are thus not actuated, in the 45° position shown in FIG. 5 the left-hand slider 20 comes into contact with the larger diameter 30 of the eccentric disc 22 whereby the left-hand slider 20 is displaced towards the left and as a result the left-hand shift claw 16 is rotated into the uncoupled position.

As can be seen in particular from FIGS. 3 to 5 the eccentric disc 22 is narrower in the region of the larger diameter 30 on the one side, namely downwardly in the drawing, than on the diametrally opposite side. That narrower region 31 provides that the right-hand slider 20 does still not come into contact with the larger diameter 30 of the eccentric disc 22 and thus remains inactive, that is to say in that position of the rotary knob 3 of being pivoted towards the left, only the left-hand claw coupling is uncoupled while the right-hand claw coupling remains in the coupled condition.

That occurs in similar fashion when the rotary knob 3 is turned from its central position shown in FIG. 3 towards the right in the clockwise direction. When the rotary knob 3 reaches the right-hand 45° position the right-hand slider 20 is displaced towards the right so that the claw coupling is uncoupled while the left-hand slider 20 is still not in contact on the left-hand side so that the left-hand claw coupling remains coupled.

When the rotary knob 3 is then further turned towards the right or the left into a 90° position then both sliders 20 pass into the region of the large diameter 30 of the eccentric disc 22, that is to say both sliders 20 are displaced outwardly and thus both shift claws 16 are pivoted in such a way that both claw couplings are uncoupled.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device for controlling an electric motor-actuated linear drive in the form of a furniture drive for adjusting moveably mounted parts of lying and seating furniture, comprising at least one threaded spindle (4, 5) drivable by way of a worm gear transmission for displacement of a respective stroke element, a guide body (7) which is non-rotatably arranged on the respective threaded spindle (4, 5) and on which a worm gear (6) is rotatably mounted, a coupling sleeve (8) which is mounted non-rotatably but axially displaceably on the respective guide body (7) and with which the worm gear (6) and the guide body (7) can be selectively connected or separated by means of a claw coupling, a respective actuating element serving for displacement of the coupling sleeves (8) and a shift mechanism for driving the respective actuating element, characterised in that provided as the shift mechanism is a knob connected by way of a spring element to a rotatably mounted eccentric disc (22), the eccentric disc (22) has latching grooves (26) which are arranged at spacings and which are associated with predetermined shift positions of the knob, a prestressed cam spring (27) bears against the eccentric disc (22) and is latchable with a cam projection (28) provided on the spring into the latching grooves (26), and the eccentric disc (22) is operatively connected to the actuating elements of the coupling sleeves (8).

2. A device according to claim 1, wherein the knob is in the form of a rotary knob (3).

3. A device according to claim 1, wherein the knob is adapted to be displaceable.

4. A device according to claim 1, for controlling an electric motor-actuated linear drive in the form of a dual drive, wherein there are provided two successively arranged and mutually aligned threaded spindles (4, 5).

5. A device according to claim 1, wherein the eccentric disc (22) is mounted rotatably in a switch housing (2).

6. A device according to claim 2, wherein the knob is mounted rotatably in a round opening (21) with the eccentric disc (22).

7. A device according to claim 1, wherein the eccentric disc (22) is symmetrical and has a larger diameter (30) and a smaller diameter (29), wherein the dimensions of the larger diameter (30) at both sides of the point of rotation of the eccentric disc (22) and also the dimensions of the smaller diameter (29) at both sides of the point of rotation of the eccentric disc (22) are of equal length.

8. A device according to claim 7, wherein the region of the larger diameter (30) of the eccentric disc (22) is narrower on one side (29) than on the diametrally opposite side.

9. A device according to claim 1, wherein the spring element is in the form of a leaf spring (23) which is fixed with one end in the opening of the eccentric disc (22) and sits with its other end between two abutment pins (24) provided on the rotary knob (3).

10. A device according to claim 1, wherein the coupling sleeves (8) are held in their coupled position under a spring bias.

11. A device according to claim 10, wherein the coupling sleeves (8) are biased by means of a plurality of coil springs (15) which are arranged distributed over the end of the sleeves and which are supported against the worm gear (6).

12. A device according to claim 1, wherein the actuating elements for displacement of the coupling sleeves (8) are in the form of shift claws (16) which engage with guide pins (17) arranged at both sides on mutually opposite sides of the respective coupling sleeve (8) into a guide groove (18) on the periphery of the coupling sleeve (8).

13. A device according to claim 12, wherein the shift claws (16) are mounted on pivot axis members (19) arranged perpendicularly to the threaded spindles (4, 5).

14. A device according to claim 13, wherein the shift claws (16) have entrainment pins which project at their rear sides and which can be actuated directly or indirectly by the rotation of the eccentric disc (22) to pivot the shift claws.

15. A device according to claim 14, wherein sliders (20) are provided for transmission of the force from the eccentric disc (22) to the entrainment pins of the shift claws (16), which sliders are guided in the axial direction of the threaded spindles (4, 5), and the sliders (20) upon rotation of the eccentric disc (22) in contact with the large diameter (30) thereof urge the coupling sleeves (8) which are biased by the coil springs (15) into the uncoupled position against the spring bias of the springs.

* * * * *